(12) United States Patent
Borscia et al.

(10) Patent No.: US 12,476,471 B2
(45) Date of Patent: Nov. 18, 2025

(54) METHOD FOR CONTROLLING A GROUP OF INTERCONNECTED ELECTRICAL SOURCES

(71) Applicant: Schneider Electric Industries SAS, Rueil Malmaison (FR)

(72) Inventors: Raymond Borscia, Calvisson (FR); Benjamin Ramanadier, Frontignan (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 14 days.

(21) Appl. No.: 18/596,736

(22) Filed: Mar. 6, 2024

(65) Prior Publication Data

US 2024/0322574 A1  Sep. 26, 2024

(30) Foreign Application Priority Data

Mar. 21, 2023 (FR) .................................. 2302612

(51) Int. Cl.
*H02J 3/46* (2006.01)
*G01R 21/133* (2006.01)
*H02J 3/00* (2006.01)

(52) U.S. Cl.
CPC .............. *H02J 3/46* (2013.01); *G01R 21/133* (2013.01); *H02J 3/004* (2020.01); *H02J 2300/10* (2020.01); *H02J 2300/24* (2020.01); *H02J 2300/28* (2020.01); *H02J 2300/30* (2020.01); *H02J 2300/40* (2020.01)

(58) Field of Classification Search
CPC .......... H02J 3/004; H02J 3/46; H02J 2300/10; H02J 2300/24; H02J 2300/28; H02J 2300/30; H02J 2300/40
USPC .......................................................... 307/44
See application file for complete search history.

(56) References Cited

U.S. PATENT DOCUMENTS

2011/0215640 A1  9/2011  Donnelly et al.
2014/0062097 A1  3/2014  Brown et al.

OTHER PUBLICATIONS

French Search Report and Written Opinion dated Mar. 6, 2024 for corresponding French Patent Application No. FR2302612, 10 pages.

*Primary Examiner* — Hal Kaplan
(74) *Attorney, Agent, or Firm* — Patterson + Sheridan, LLP

(57) ABSTRACT

A method is proposed for controlling a set of electrical sources that are interconnected so as to supply an electrical network. The method includes: (i) determining, in real-time, a total electrical power requirement to be supplied to the network, (ii) determining, for each electrical source, a value of a physical parameter representative of the operation of the electrical source as a function of the electrical power supplied by the electrical source, (iii) determining, for the set of the electrical sources, the sum of the values of the physical parameter representative of the operation of each electrical source, so as to form a total value of the physical parameter representative of the operation of the network, (iv) controlling the electrical power supplied by each electrical source such that the total electrical power produced is equal to the total electrical power requirement to be supplied to the network and so as to minimise the total value of the physical parameter.

14 Claims, 3 Drawing Sheets

METHOD FOR CONTROLLING A GROUP OF INTERCONNECTED ELECTRICAL SOURCES

TECHNICAL FIELD

The present invention relates to the field of the management of electrical distribution networks, in particular the networks that comprise a set of sources, notably generators using different primary energy sources.

PRIOR ART

As is well known, the production of electricity in certain electrical distribution networks can be done from electrical production sources of different kinds. For example, one or more generators driven by combustion engines can be associated with one or more wind turbines, and with photovoltaic sources or even with fuel cells. This type of network can be employed for example in place of a main distribution network linked to an electrical power plant, in order to replace it in the event of failure. Thus, hospitals generally have an autonomous electrical current supply system using a set of combustion engines, this autonomous system being activated in the event of failure of the main network. For isolated places for which a connection to an electrical production plant is not possible, the generation of electrical current by this type of network can be permanent, no other source of electrical production being available. Such is the case for example for cargo boats transporting goods, or for oil platforms. Such is also the case for distant sites that are connected to or isolated from an electrical source, such as a chalet or mountain refuge, a remote village, or even an autonomous island.

In order to be able to address the fluctuations over time of the electrical power to be supplied, it is standard practice to operate the set of generators at a power that is both well below their maximum power, and much greater than their minimum power. The electrical power supplied can thus be rapidly increased, or reduced depending on the instantaneous requirements of the consumers connected to the network. The adequacy of the electrical power supplied to the network by the different generators to the requirement of the various electrical loads activated on the network is thus permanently obtained.

It is standard practice for the total power supplied to be distributed equally between the different generators activated on the network. In other words, the total power to be supplied is divided by the number of generators, and each source is controlled such that each generator supplies the same percentage of the total electrical power as the other generators. The control of the electrical network, particularly upon variations of power supplied, is thus simplified. In addition, the wear is substantially uniform between the different generators, which simplifies the management of the maintenance operations on these equipment items. However, such a method for managing the network does not make it possible to minimise the polluting emissions generated by the operation of the different electrical sources, in particular when they include combustion engines. Nor does such a method make it possible to minimise the quantity of fuel consumed in their operation, particularly when a so-called renewable energy source contributes to the total electrical power.

The aim of the present invention is to propose a method that notably makes it possible to reduce the gaseous effluents generated by the operation of the electrical network.

SUMMARY

To this end, the invention proposes a method for controlling a set of electrical sources that are interconnected so as to supply an electrical network, each electrical source being configured to produce an electrical power that can be controlled in real-time, the method comprising the steps of:
(i) determining in real-time a total electrical power requirement to be supplied to the electrical network by the set of electrical sources,
(ii) determining, for each electrical source, a value of a physical parameter representative of the operation of the electrical source as a function of the electrical power supplied by the electrical source,
(iii) determining, for the set of the electrical sources, the sum of the values of the physical parameter representative of the operation of each electrical source, so as to form a total value of the physical parameter representative of the operation of the electrical network,
(iv) controlling the electrical power supplied by each electrical source such that the total electrical power produced by the set of electrical sources is equal to the total electrical power requirement to be supplied to the electrical network and so as to minimise the total value of the physical parameter.

Unlike conventional control methods, the proposed control method takes account of the individual behaviour of each electrical source in order to obtain an optimum for the operation of the electrical network. The contribution of each of the electrical sources to the total power to be supplied is adjusted individually so as to optimise the operation of the set.

The features listed in the following paragraphs can be implemented independently of one another or according to all technically possible combinations:

The total value of the physical parameter is representative of the overall operation of the set of electrical sources which are interconnected so as to power the electrical network.

At least one electrical source of the electrical network comprises a generator driven by a combustion engine.

A plurality of electrical sources of the electrical network each comprises a generator driven by a combustion engine.

The physical parameter representative of the operation of the electrical source is a flow rate of a gaseous compound formed in the operation of the electrical source.

The gaseous compound formed in the operation of the electrical source can be carbon dioxide, or nitrogen oxides, or unburnt hydrocarbons.

The physical parameter representative of the operation of the electrical source is an hourly flow rate of fuel consumed in the operation of the electrical source.

At least one electrical source of the electrical network comprises a generator driven by a wind turbine.

As a variant or in addition, at least one electrical source of the electrical network comprises a set of photovoltaic panels.

A power source comprises a fuel cell consuming a reducing agent fuel.

At least one electrical source of the electrical network comprises an electrical energy storage battery.

At least one electrical source of the electrical network comprises a generator driven by a flywheel.

The physical parameter representative of the operation of the electrical source is a cost of operation of the electrical source.

According to one aspect of the control method, the electrical power produced by an electrical source differs from the electrical power produced by the other electrical sources of the set of electrical sources.

By differentiating the electrical power produced by the different sources, it is possible to prioritize the most efficient source or sources. The remaining electrical sources supply the additional electrical power needed to supply the total electrical power requirement of the network. The overall operation of the electrical network is thus optimised.

The production sources that are said to be non-polluting or to offer less pollution are prioritized, and the remaining electrical production to be supplied to satisfy the overall requirement of the network is left to the remaining electrical sources. Furthermore, the proportion of the total production which is ensured by the so-called non-polluting sources can be limited to a maximum value in order to guarantee the possibility of addressing the instantaneous variations of the total production requirement.

In other words, the different electrical sources of the network do not contribute in a balanced way to the total electrical production to be supplied to the electrical network.

According to one aspect of the control method, the electrical power produced by an electrical source differs from the output electrical power of the electrical network divided by the number of electrical sources of the electrical network.

According to one embodiment of the control method, a deviation between the electrical power produced by an electrical source of the electrical network and the output electrical power of the electrical network divided by the number of electrical sources of the electrical network is greater than a predetermined threshold.

According to one embodiment of the control method, the value of the physical parameter representative of the operation of an electrical source is a value mapped as a function of an electrical power supplied by the electrical source.

The use of a mapped value makes it possible to reduce the necessary computation resources.

The table supplying a value of the physical parameter representative of the operation of the electrical source can be a one-dimensional mapping.

The table supplying a value of the physical parameter representative of the operation of the electrical source can be a two-dimensional mapping.

Two independent parameters can thus be taken into account, which improves the accuracy of the estimation.

According to an exemplary implementation of the control method, the value of the physical parameter representative of the operation of an electrical source is a value calculated from a prediction model and at least one quantity from among the following quantities: electrical power produced, operating temperature, ambient humidity, type of fuel used.

These quantities make it possible to take account of the real operating conditions of the electrical sources, that are likely to change over time.

The method can comprise the steps of:
(i2) Determining, for each electrical source, a maximum electrical power that can be produced by this electrical source,
(ii2) If the value of the physical parameter representative of the operation of the electrical source is below a predetermined threshold, controlling the electrical power supplied by the electrical source to the maximum electrical power that can be produced by this electrical source,
(iii3) Updating the set of electrical sources by deleting the source for which the value of the physical parameter representative of the operation of the electrical source is below the predetermined threshold,
(ii3) Updating the total electrical power requirement to be supplied to the electrical network by the updated set of electrical sources.

In order to have the method converge more rapidly, it is possible to prioritize the electrical sources for which the value of the physical parameter representative of the operation of this electrical source is very low. The defined threshold that makes it possible to force the use of a source at its current maximum power is chosen to make it possible to differentiate the renewable sources of notably photovoltaic or wind turbine type from the non-renewable sources.

The value of the physical parameter representative of the operation of the electrical source is calculated in real-time.

The control method comprises the step of:
determining the electrical power produced by each electrical source.

The control method can comprise the step of:
determining the electrical power produced by the set of electrical sources.

The control method can comprise the step of:
determining the operating temperature of an electrical source.

The control method can comprise the step of:
determining an ambient humidity of an electrical source.

The control method can comprise the step of:
determining the type of fuel used by the electrical source.

According to an exemplary implementation of the control method, the value of the physical parameter representative of the operation of an electrical source is a value measured by a measurement sensor.

The value measured by the measurement sensor is a real-time value.

The control method can comprise the step of:
updating a table for determining the value of the physical parameter representative of the operation of the electrical source from a measured value of the physical parameter representative of the operation of the electrical source.

The control method can comprise the step of:
updating the prediction model of the value of the physical parameter representative of the operation of an electrical source from a measured value of the physical parameter representative of the operation of the electrical source.

The updating of the model from acquired data corresponding to the real operation of each source, or of a part of them, makes it possible to take account of the drifts associated with the ageing of the equipment items and the diverse operating conditions.

The model can be an analytical model, for example a function of several variables.

The model can be obtained by a machine learning phase performed on a set of operating points carried out in reference conditions.

According to one embodiment, the control method comprises the steps of:
for each electrical source, determining a coefficient of variation of the value of the physical parameter representative of the operation of the electrical source as a function of a variation of the electrical power produced, for the set of the electrical sources, determining an average coefficient of variation from the set of the determined coefficients of variation, for the set of the electrical sources, determining a normalised coefficient of variation from the set of the determined coefficients of variation, for each electrical source, determining a setpoint of variation of electrical power to be produced as a function of the electrical power produced, as a function of the determined coefficient of variation, as a function of the determined average coefficient of variation, and as a function of the determined normalised coefficient of variation, for each electrical source, determining a setpoint of electrical power to be produced as a function of the electrical power produced and of the determined setpoint of variation of electrical power to be produced, controlling each electrical source such that, for each electrical source, the electrical power produced is equal to the determined setpoint of electrical power.

According to an exemplary embodiment of the control method, the setpoint of variation of electrical power to be produced is determined from a predetermined coefficient.

The predetermined coefficient is a multiplying factor applied to the determined setpoint of variation of electrical power to be produced.

The predetermined coefficient takes a single value for the set of the electrical sources of the electrical network.

The predetermined coefficient can be a constant value.

The predetermined coefficient is comprised between 0 and 1.

The predetermined coefficient is comprised for example between 0.25 and 0.40.

The predetermined coefficient can be a value that changes in real-time.

The predetermined coefficient can vary in real-time as a function of the variations of electrical power setpoint of the electrical network.

According to one aspect of the control method, the different steps are iterated so as to converge towards a minimum value of the physical parameter representative of the operation of the electrical network.

According to one embodiment of the control method, the coefficient of variation of the value of the physical parameter representative of the operation of the electrical source as a function of a variation of the electrical power produced is calculated by the equation:

$$G_k = \frac{d}{dP_k} V_k(P_k) \quad \text{[Math. 1]}$$

According to one embodiment of the control method, the average coefficient of variation is calculated by the equation:

$$G\_moy = \frac{1}{n}\sum_{i=0}^{n-1} \frac{d}{dP_k} V_k(P_k) \quad \text{[Math. 2]}$$

According to one embodiment of the control method, the normalised coefficient of variation is calculated by the equation:

$$G\_norm = \frac{1}{n}\sqrt{\sum_{i=0}^{n-1}\left(\frac{d}{dP_k} V_k(P_k)\right)^2} \quad \text{[Math. 3]}$$

According to one embodiment of the control method, the setpoint of electrical power to be produced is calculated as a function of the electrical power produced and from the setpoint of variation of electrical power to be produced determined by the equation:

$$C\_P_k = P_k + \delta\_P_k = P_k - c \cdot \frac{G_k - G\_moy}{G\_norm} \quad \text{[Math. 4]}$$

The equation used allows for a rapid convergence towards a minimum value, with a moderate computation complexity.

The setpoint of variation of electrical power to be produced is determined by the equation:

$$\delta\_P_k = -c \cdot \left(\frac{d}{dP_k} V_k(P_k) - \frac{1}{n}\sum_{i=0}^{n-1} \frac{d}{dP_k} V_k(P_k)\right) \bigg/ \left(\frac{1}{n}\sqrt{\sum_{i=0}^{n-1}\left(\frac{d}{dP_k} V_k(P_k)\right)^2}\right) \quad \text{[Math. 5]}$$

The disclosure also relates to an electronic control unit, configured to implement the control method described previously.

BRIEF DESCRIPTION OF THE DRAWINGS

Other features, details and advantages will become apparent on reading the following detailed description, and on analysing the attached drawings, in which.

DESCRIPTION OF THE EMBODIMENTS

In order to simplify the reading of the figures, the various elements are not necessarily represented to scale. In these figures, the elements that are identical bear the same references. Some elements or parameters can be indexed, that is to say designated for example by first element or second element, or even first parameter and second parameter, et cetera. The purpose of this indexing is to differentiate elements or parameters that are similar, but not identical.

This indexing does not imply a priority of one element, or parameter over another, and the denominations can be interchanged. When it is specified that a subsystem comprises a given element, that does not preclude the presence of other elements in this subsystem.

Figure 1:
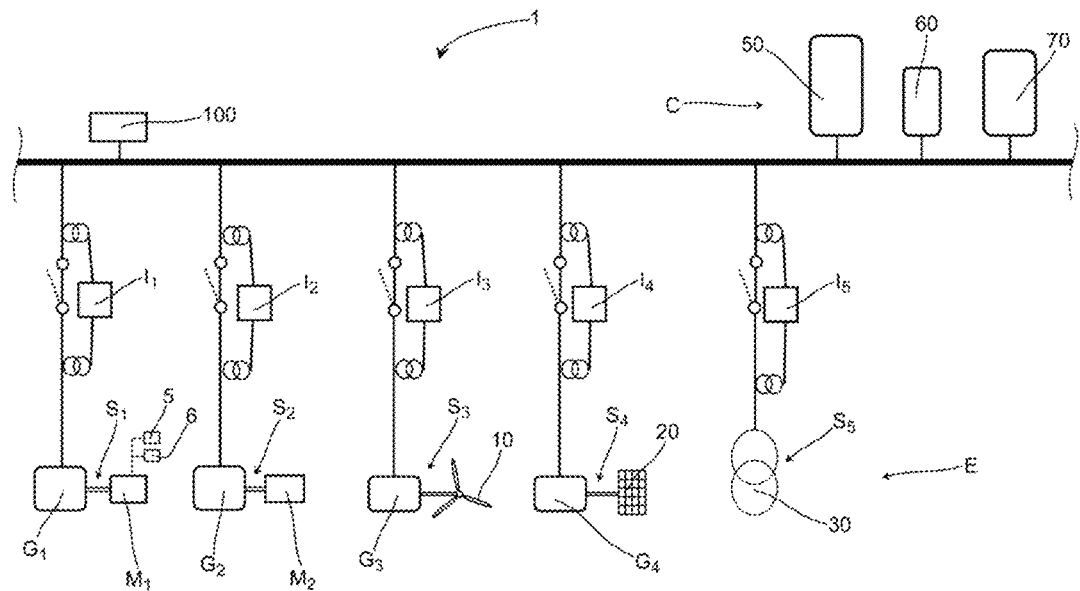
FIG. 1 is a schematic representation of an electrical network comprising a set of electrical sources.

FIG. 1 represents an electrical network 1 comprising a set C of electrical loads connected to the electrical network 1 and a set E of electrical sources also connected to the electrical network 1.

In this figure, the symbols 50, 60, 70 designate three distinct electrical loads of the set C of electrical loads. Any number of loads can be connected.

The set C of electrical loads consumes a total electrical power C_Ptot.

The set E of electrical sources illustrated here comprises five electrical sources $S_1$, $S_2$, $S_3$, $S_4$, $S_5$. The number of sources that can be connected to the electrical network 1 can be any number, and will be designated by the number n. Each source $S_1$, $S_2$, $S_3$, $S_4$, $S_5$ can be selectively connected to the electrical network, or disconnected therefrom, by a switching device $I_1$, $I_2$, $I_3$, $I_4$, $I_5$.

At least one electrical source $S_k$ of the electrical network 1 comprises a generator $G_k$ driven by a combustion engine $M_k$.

Generally, a plurality of electrical sources $S_k$ of the electrical network 1 each comprises a generator $G_k$ driven by a combustion engine $M_k$.

In the example illustrated, the source $S_1$ and the source $S_2$ each comprise a generator driven by a combustion engine, also called combustion engine.

The combustion engine $M_k$ is powered by a fuel. The combustion of the fuel generates mechanical work that makes it possible to drive a generator $G_k$ of alternator type, which produces electrical current. The chemical energy contained in the fuel is thus transformed into electrical energy by the association of a combustion engine $M_k$ and an alternator $G_k$. The combustion of the fuel generates various gaseous compounds, the emissions of which should desirably be limited.

The combustion engine driving the generator can be an alternating motor. The combustion engine driving the generator can be a gas turbine.

At least one electrical source $S_k$ of the electrical network 1 comprises a generator $G_k$ driven by a wind turbine.
In a wind turbine, a rotary blade driven by the wind drives a generator of alternator type.
In the example illustrated, the source $S_3$ here comprises a generator driven by a wind turbine 10.

At least one electrical source $S_k$ of the electrical network 1 comprises a set of photovoltaic panels.
The photovoltaic panels produce an electrical current from the energy of the incident light radiation.
In the example illustrated, the source $S_4$ comprises a set of photovoltaic panels 20.

At least one electrical source $S_k$ of the electrical network 1 comprises an electrical energy storage battery.
The source $S_5$ comprises a set 30 of electrical energy storage batteries.

Other types of electrical sources are of course possible.
For example, an electrical source $S_k$ can comprise a fuel cell consuming a reducing agent fuel.
The reducing agent fuel can for example be hydrogen.
Similarly, at least one electrical source $S_k$ of the electrical network 1 can comprise a generator $G_k$ driven by a flywheel. The mechanical energy stored by the flywheel is restored when the generator coupled to the flywheel is being driven.

The invention proposes a method for controlling a set E of electrical sources $S_1$, ..., $S_n$ that are interconnected so as to power an electrical network 1, each electrical source $S_k$ being configured to produce an electrical power $P_k$ that can be controlled in real-time.

Figure 6:
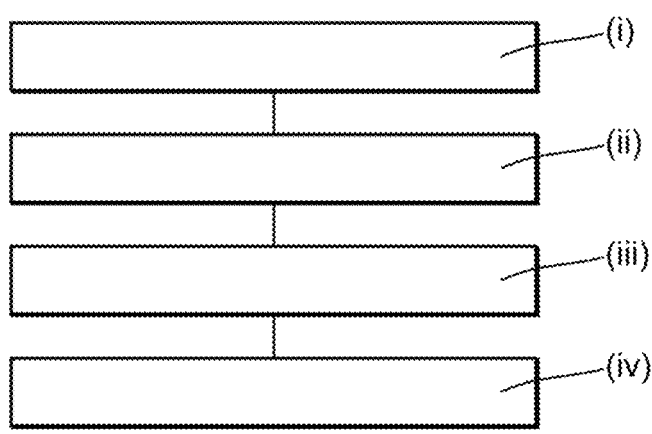
FIG. 6 is a block diagram, illustrating different steps of the method according to the invention.

As shown in FIG. 6, the method comprises the steps of:
(i) determining in real-time a total electrical power requirement C_Ptot to be supplied to the electrical network 1 by the set E of electrical sources $S_1$, ..., $S_n$,
(ii) determining, for each electrical source $S_k$, a value $V_k$ of a physical parameter V representative of the operation of the electrical source $S_k$ as a function of the electrical power $P_k$ supplied by the electrical source $S_k$,
(iii) determining, for the set of the electrical sources $S_1$, ..., $S_n$, the sum of the values $V_k$ of the physical parameter V representative of the operation of each electrical source $S_k$, so as to form a total value V_tot of the physical parameter V representative of the operation of the electrical network 1,
(iv) controlling the electrical power $P_k$ supplied by each electrical source $S_k$ such that the total electrical power P_tot produced by the set E of electrical sources $S_1$, ..., $S_n$ is equal to the total electrical power requirement C_Ptot to be supplied to the electrical network 1 and so as to minimise the total value V_tot of the physical parameter V.

Unlike the conventional control methods, the proposed control method takes account of the individual behaviour of each electrical source $S_1$, ..., $S_n$ in order to obtain an optimum for the operation of the electrical network 1 as a whole. The contribution of each of the electrical sources to the total power to be supplied is adjusted individually so as to optimise the operation of the set of the electrical sources powering the network.

The total value V_tot of the physical parameter V is representative of the overall operation of the set E of electrical sources $S_1$, ..., $S_n$ which are interconnected so as to power the electrical network 1.

The physical parameter $V_k$ representative of the operation of the electrical source $S_k$ is, in the example illustrated, a flow rate of a gaseous compound formed in the operation of the electrical source $S_k$.

The physical parameter $V_k$ representative of the operation of the electrical source $S_k$ is a quantity emitted per unit of time of a gaseous compound formed in the operation of the electrical source $S_k$. It is desirable to minimise this quantity.

The gaseous compound formed in the operation of the electrical source can be carbon dioxide, or nitrogen oxides, or unburnt hydrocarbons.

Figure 2:
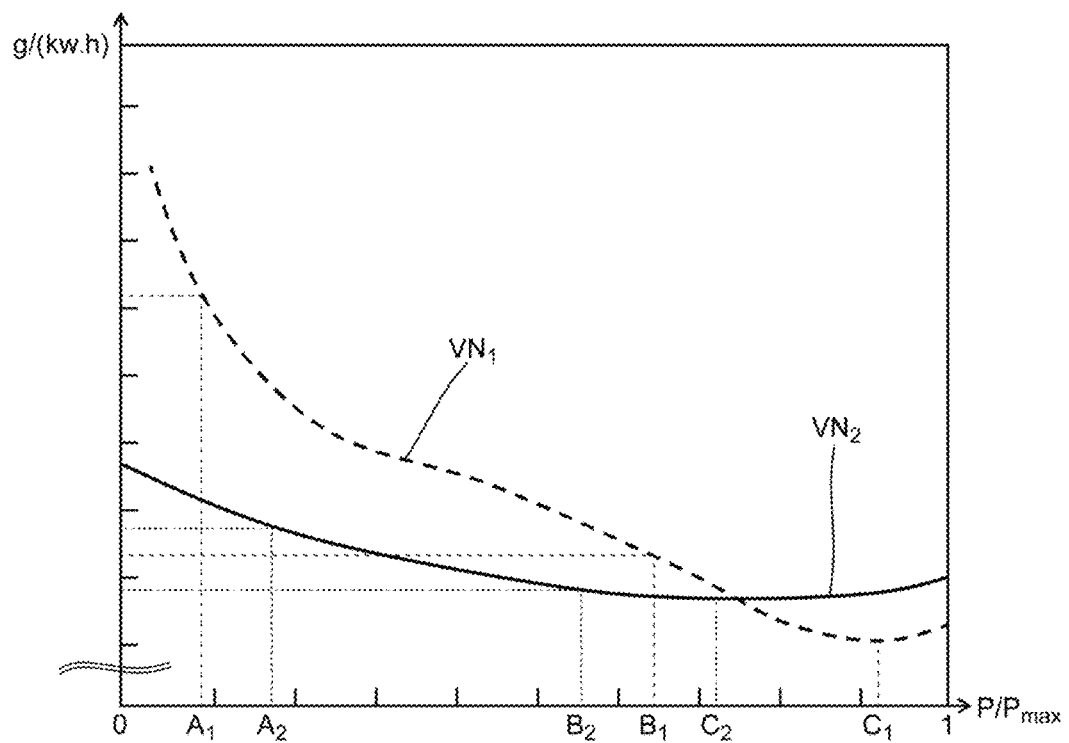
FIG. 2 is a curve schematically representing the evolution of the specific fuel consumption of a combustion engine as a function of the power produced.

FIG. 2 illustrates the specific quantity of carbon dioxide ($CO_2$) emitted by a combustion engine of the type of that driving the electrical generators of the sources $S_1$ and $S_2$. In this figure, the specific emissions of $CO_2$, expressed in grams of $CO_2$ per kilowatt-hour, are plotted as a function of the power supplied, expressed as a function of the fraction of the maximum power used. In other words, for each curve, the ordinate of each point is obtained by dividing the hourly flow rate of $CO_2$ produced, expressed in grams per hour, by the power produced, expressed in kilowatts. The abscissa of each point is obtained by dividing the power produced for this operating point by the maximum power that can be produced by the combustion engine.

The curve $VN_1$ characterises the operation when the engine is powered by gas, for example methane. The curve $VN_2$ characterises the operation when the engine operates with diesel fuel. The vertical scale is indicative.

In both cases, it will be seen that the specific emissions of carbon dioxide, that is to say the emissions added to the power produced, decrease when the power supplied increases.

Thus, on the curve designated by the symbol $VN_1$, the specific emissions are higher for the operating point $A_1$ than for the operating point $B_1$ for which the engine works closer to its maximum power. The minimum value is obtained for the operating point $C_1$.

Likewise, when the engine operates with diesel fuel, curve $VN_2$, the specific emissions are higher for the operating point $A_2$ than for the operating point $B_2$, and the minimum specific emissions are obtained for the operating point $C_2$. It is therefore desirable to have the electrical sources driven by a combustion engine operate in the operating zones close to $C_1$ or $C_2$.

Figure 3:
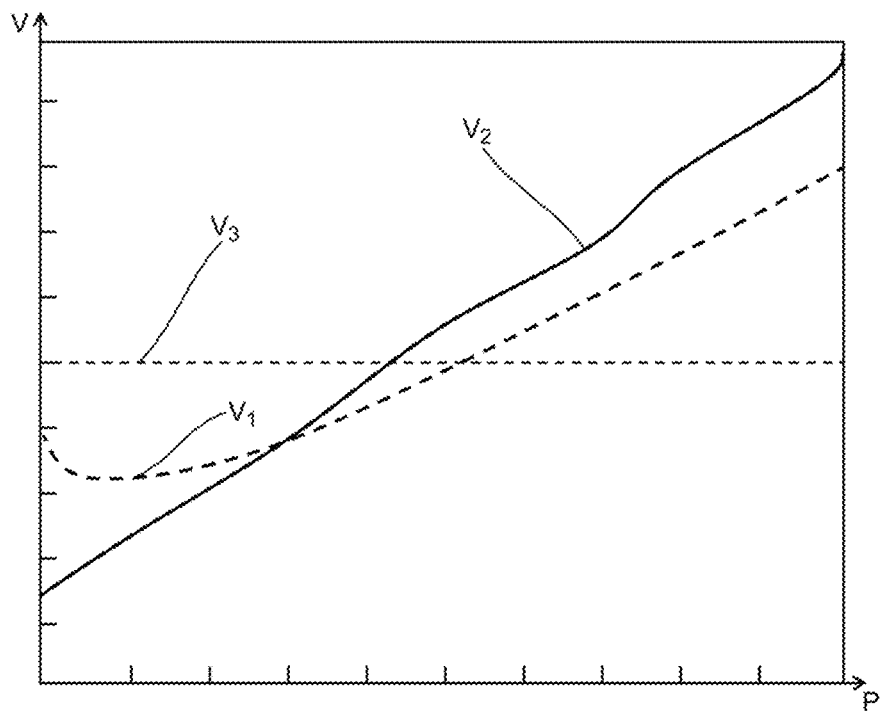
FIG. 3 is a curve schematically representing the evolution of the carbon dioxide emissions of different electrical sources as a function of the power produced.

FIG. 3 illustrates the value of the physical parameter $V_k$ representative of the operation of three electrical sources $S_1$, $S_2$, $S_3$ as a function of the power supplied. FIG. 3 therefore illustrates the absolute value of the parameter V, for example in grams per hour, and not a specific value in grams per kilowatt-hour, illustrated as in FIG. 2.

The curves $V_1$ and $V_2$, corresponding to the sources that use a combustion engine, are overall upward curves, that is to say that the hourly emissions increase with the power produced.

For the electrical sources that do not consume any fuel, such as a wind turbine or a photovoltaic source, the carbon dioxide emissions are not linked to the power produced. The overall emissions are not nevertheless zero, because a total operating time corresponding to the predicted lifetime of the equipment is associated with the total quantity of carbon dioxide produced to manufacture the equipment. An average hourly flow rate produced can therefore be calculated. This average hourly flow rate is for example a constant that is not zero.

The curve $V_3$ corresponds to such a source.

According to another exemplary implementation of the method, the physical parameter $V_k$ representative of the operation of the electrical source $S_k$ can be an hourly flow rate of fuel consumed when the electrical source is operating.

The fuel is the fuel in the case of a combustion engine. The fuel can be heavy fuel, for example for a combustion engine embedded on a cargo boat. The fuel can be gas or liquefied gas. The curves of flow rate of fuel consumed as a function of the power supplied have the same appearance as the curves of FIG. 3.

The fuel is the reducing agent in the case of a fuel cell.

According to yet another exemplary implementation of the method, the physical parameter representative of the operation of the electrical source $S_k$ is a cost of operation of the electrical source $S_k$.

The cost of operation can comprise a fixed part, linked to the installation investment which is for example added to the number of hours of use planned over the predicted lifetime of the equipment. The cost of operation can comprise a variable part, linked to the fuel consumption costs, which depends on the electrical power supplied. When the physical quantity taken into account is the cost of operation, the proposed method aims to minimise the cost of operation of the set of the electrical sources powering the electrical network.

The operation of the different electrical sources is not coupled. In other words, the value of the physical parameter V of a given source $S_k$ is not affected by the value of the physical parameter of the other sources present on the electrical network 1.

Similarly, the value of the physical parameter V of a given source $S_k$ is not affected by the electrical power supplied by the other electrical sources connected to the electrical network 1.

The number of electrical sources connected to the network 1 is constant during the implementation of the method. In other words, the fluctuations over time of the total electrical power requirement C_Ptot to be supplied to the network 1 are managed by modifying the electrical power supplied by the electrical sources already connected to the electrical network 1. No provision is made to disconnect an electrical source from the network when the power requirement to be supplied decreases, or to connect a new source to the network when the power requirement to be supplied increases. When there is a need to add an electrical source to the electrical network already constructed or to disconnect an electrical source from the electrical network already constructed, the proposed method remains active, involving a real-time updating of the composition of the set E of electrical sources. This update is automatic for the operator of the electrical network.

According to one aspect of the control method, the electrical power $P_k$ produced by one electrical source $S_k$ differs from the electrical power $P_i, \ldots, P_j$ produced by the other electrical sources $S_i, \ldots, S_j$ of the set E of electrical sources.

By differentiating the electrical power produced by the different sources, it is possible to prioritize the most efficient source or sources. The remaining electrical sources supply the additional electrical power necessary to supply the total electrical power requirement of the network 1. The overall operation of the electrical network is thus optimised.

It is understood that the electrical power $P_k$ produced by one electrical source $S_k$ differs from the electrical power $P_i, \ldots, P_j$ produced by the other electrical sources in permanent operation.

In other words, the different electrical sources of the network do not contribute in a balanced manner to the total electrical production to be supplied to the network 1.

In other words, the electrical power $P_k$ produced by an electrical source $S_k$ differs from the output electrical power P_tot of the electrical network 1 divided by the number n of electrical sources of the electrical network 1.

The different electrical sources of the electrical network contribute in a non-balanced, or unbalanced, manner to the total electrical production. This imbalance is present in permanent operation.

According to one embodiment of the control method, a deviation between the electrical power $P_k$ produced by an electrical source $S_k$ of the electrical network and the output electrical power P_tot of the electrical network 1 divided by the number of electrical sources n of the electrical network is greater than a predetermined threshold Th.

Figure 5:
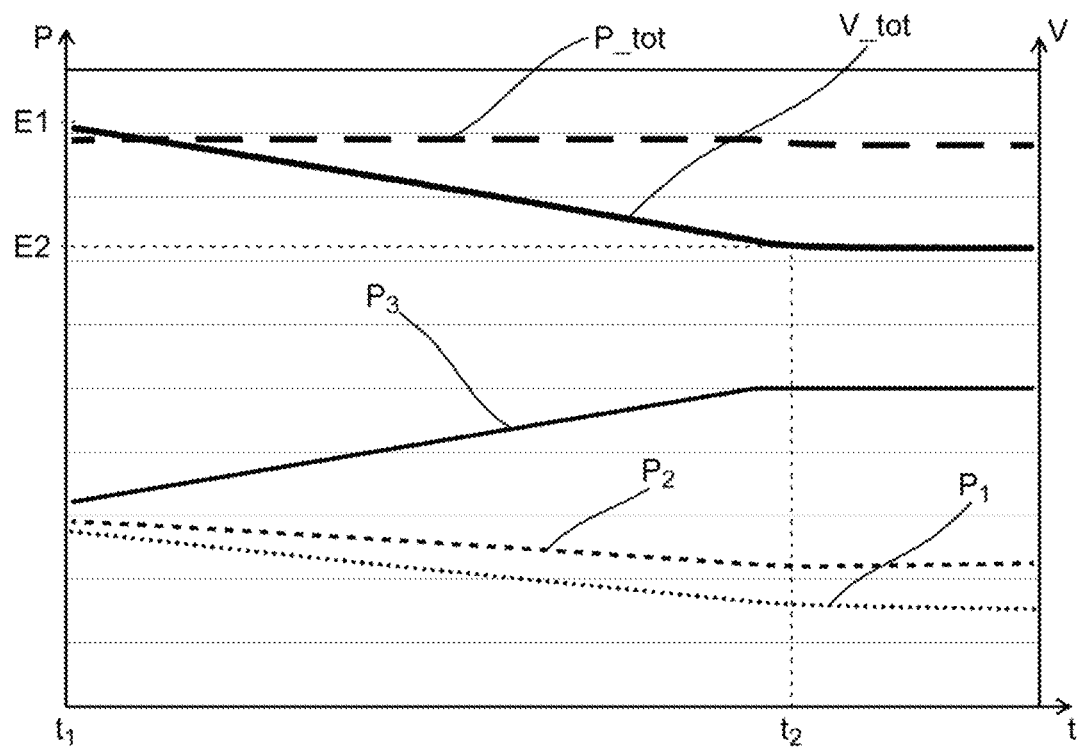
FIG. 5 is a curve showing the time evolution of a physical parameter representative of the operation of the electrical source when the method is implemented.

FIG. 5 relates to a variant of the electrical network of FIG. 1, comprising three electrical sources comprising a generator driven by a combustion engine. This figure illustrates the trending over time of the total value V_tot of the physical parameter V representative of the operation of the electrical network 1, the trending of the total power supplied P_tot as well as the contribution of each of the three electrical sources, respectively $P_1, P_2, P_3$.

The Y axis situated on the left corresponds to the powers supplied, and the Y axis situated on the right corresponds to the physical parameter V, which, here, is the hourly flow rate of carbon dioxide emitted.

At the instant $t_1$, the powers $P_1$, $P_2$, $P_3$ supplied by each of the three electrical sources are balanced, that is to say that each of the sources produces substantially the same power as the other sources. The proposed method then begins to be applied.

The total power supplied P_tot is substantially constant over time.

Once the method is applied, the power $P_3$ supplied by the third source increases, so as to have this source operate in a more favourable zone, according to the principle illustrated in FIG. 2. The contribution of the second source and of the third source decreases, that is to say that the power $P_2$ and the power $P_1$ decrease. The gain obtained by having one of the sources operate within an operating range close to its maximum power is greater than the increase that may occur for the sources operating at reduced power, and, globally, the value V_tot of the parameter V decreases.

From the instant $t_2$, the operating parameters have converged to an optimised value and the power supplied by the three sources no longer changes.

The parameter V changes from the value E1 at the initial instant $t_1$ to the value E2 at the instant $t_2$. The operation of the electrical network 1 is optimised, since the parameter V, which, here, is the carbon gas emissions, are reduced between the initial instant $t_1$ at which the method begins to be applied and the instant $t_2$ when the operation is stabilised.

The value $V_k$ of the physical parameter V representative of the operation of the electrical source $S_k$ is calculated in real-time.

The value $V_k$ of the physical parameter V representative of the operation of an electrical source $S_k$ can be determined in different ways.

According to one embodiment of the control method, the value $V_k$ of the physical parameter V representative of the operation of an electrical source $S_k$ is a value mapped as a function of an electrical power $P_k$ supplied by the electrical source $S_k$.

The use of a mapped value makes it possible to reduce the necessary computation resources.

A table $T_k$ supplying the value $V_k$ of the physical parameter V representative of the operation of the electrical source $S_k$ is determined for example during the manufacturing phase of the electrical source $S_k$. For that, a measurement equipment item can be temporarily installed. This equipment item is then removed and is not used in the operation of the electrical source $S_k$ on the electrical network 1.

For example, the emissions of the combustion engine driving a generator are measured over a certain number of operating points the make it possible to characterise the engine. These values are used to establish the tables for determining the value $V_k$ of the physical parameter V as a function of the electrical power produced by the electrical source $S_k$.

The table $T_k$ supplying a value $V_k$ of the physical parameter V representative of the operation of the electrical source $S_k$ can be a one-dimensional mapping. The table $T_k$ supplies a value $V_k$ corresponding to the source of index k $S_k$ as a function of a single parameter, which, here, is the electrical power supplied by this electrical source.

Each operating point for which the operation of the combustion engine has been characterised can be used to define a control point of the mapping. When a value of the output parameter of the mapping has to be determined for a value of the input parameter lying between two control points, an interpolation is performed.

The table $T_k$ supplying the value $V_k$ of the physical parameter V representative of the operation of the electrical source $S_k$ can be a two-dimensional mapping. Two independent parameters can be taken into account, which improves the accuracy of the estimation.

In this case, the table $T_k$ supplies a value $V_k$ corresponding to the source of index k $S_k$ as a function of two parameters. The first parameter is, here, the electrical power supplied by this electrical source. The second parameter can be the ambient temperature around the electrical source $S_k$.

According to an exemplary implementation of the control method, the value $V_k$ of the physical parameter V representative of the operation of an electrical source $S_k$ is a value calculated from a prediction model $U_k$ and from at least one quantity out of the following quantities: electrical power produced, operating temperature, ambient humidity, type of fuel used.

These quantities make it possible to take account of the real conditions of operation of the electrical sources, which are likely to change over time. Also, the real conditions of use can vary with respect to the conditions in which the initial characterizations were made, notably because of the temperature and ambient humidity differences. It can therefore be useful to take account of these factors in the calculations of the values of the physical parameter V.

The method can comprise the steps of:
(i2) Determining, for each electrical source $S_k$, a maximum electrical power $PMax_k$ that can be produced by this electrical source $S_k$,
(ii2) If the value $V_k$ of the physical parameter V representative of the operation of the electrical source $S_k$ is below a predetermined threshold Th, controlling the electrical power $P_k$ supplied by the electrical source $S_k$ to the maximum electrical power $PMax_k$ that can be produced by this electrical source $S_k$,
(iii3) Updating the set E of electrical sources by deleting the source $S_k$ for which the value $V_k$ of the physical parameter V representative of the operation of the electrical source $S_k$ is below the predetermined threshold Th,
(ii3) Updating the total electrical power requirement C_Ptot to be supplied to the electrical network 1 by the updated set E of electrical sources $S_1$, . . . , $S_{k-1}$, $S_{k+1}$, . . . , $S_n$.

In other words, in order to have the proposed method converge more rapidly, it is possible to directly take into account the fact that the electrical sources for which the value $V_k$ of the physical parameter V is very low are used as a priority out of the set of electrical sources available.

For example, if a photovoltaic source is available, the method can begin by using the maximum power that this source can supply. The remaining power to be supplied by the remaining electrical sources to supply the total power setpoint is then optimised by application of the steps already described. The maximum power that can be supplied by a source is determined in real time, since the latter can change over time, as a function notably of the weather conditions. The defined threshold that makes it possible to force the use of a source at its maximum power available at that instant is chosen to make it possible to differentiate the renewable sources, notably of photovoltaic or wind turbine type, from the non-renewable sources of generator type driven by a combustion engine.

The control method comprises the step of:
  determining the electrical power $P_k$ produced by each electrical source $S_k$.

The control method comprises the step of:
  determining the electrical power P_tot produced by the set E of electrical sources $S_1, \ldots, S_n$.

Other operating parameters of the electrical sources can also be determined.

The control method can thus comprise the step of:
  determining the operating temperature of an electrical source $S_k$.

The control method can also comprise the step of:
  determining an ambient humidity of an electrical source $S_k$.

A measurement sensor disposed in proximity to the electrical source $S_k$ makes it possible to measure these physical quantities. In FIG. 1, the symbol 6 designates the measurement sensor or sensors the make it possible to measure these physical quantities.

The control method can also comprise the step of:
  determining the type of fuel used by the electrical source $S_k$.

The type of fuel used can be indicated by an operator by means of a human-machine interface. The type of fuel used can also be determined automatically by a sensor.

According to one exemplary implementation of the control method, the value $V_k$ of the physical parameter V representative of the operation of an electrical source $S_k$ is a value measured by a measurement sensor 5.

The value measured by the measurement sensor 5 is a real-time value.

The sampling frequency is adapted to the rate of variation of the phenomena to be taken into account.

In other words, the value $V_k$ of the physical parameter V representative of the operation of an electrical source $S_k$ can be determined indirectly for example by tables characterising the behaviour of the electrical source, and can, as a variant, be determined by a direct measurement.

It is possible to use one of the methods for some of the sources and the other method for other sources.

The control method can comprise the step of:
  updating a table $T_k$ for determining the value $V_k$ of the physical parameter V representative of the operation of the electrical source $S_k$ from a measured value of the physical parameter V representative of the operation of the electrical source $S_k$.

The values contained in the table $T_k$ supplying the value $V_k$ of the physical parameter V representative of the operation of the electrical source $S_k$ can be updated from the values supplied by a measurement equipment item. The installation of the equipment item can be temporary. The aim of the update is to take into account any ageing of the electrical source $S_k$, or conditions of use different from the conditions in which the initial characterisation was made.

The control method can comprise the step of:
  updating the prediction model $U_k$ of the value $V_k$ of the physical parameter V representative of the operation of an electrical source $S_k$ from a measured value of the physical parameter V representative of the operation of the electrical source $S_k$.

The updating of the model from acquired data corresponding to the real operation of each source, or of a part of them, makes it possible to take into account the drifts linked to the ageing of the equipment items and the spreads of operating conditions.

Furthermore, operating conditions that were not characterised initially can be taken into account. For example, a type of fuel used which differs from the type of fuel initially planned can be taken into account.

The model $U_k$ can be an analytical model, for example a function of several variables.

The model $U_k$ can also be obtained by a machine learning phase performed over a set of operating points performed in reference conditions.

The data used for the machine learning can be experimental data acquired in real conditions of use. Each experimental point is used for the construction of a model whose inputs are operational parameters, such as the power supplied, the type of fuel used, the ambient temperature, et cetera. The model is a multi-dimensional model and the number of dimensions can vary according to the number of operating parameters measured and according to the desired level of refinement.

For the set E of the electrical sources $S_1, \ldots, S_n$, the value of the physical parameter V can originate, for some sources, from mapped values, and, for other sources, from a prediction model.

The type of model used can vary from one electrical source to the other. The behaviour of some sources can be based on an analytical model, and the behaviour of other sources on a model obtained by machine learning. It is also possible to update the model over the period of use of the different sources, for example in the case of replacement of certain members that modify the operation.

Furthermore, it is possible to use, for certain sources, a value measured in real-time by a measurement sensor.

One possible implementation of the proposed method will now be described.

According to one embodiment, the control method comprises the steps of:
  for each electrical source $S_k$, determining a coefficient of variation $G_k$ of the value $V_k$ of the physical parameter representative of the operation of the electrical source $S_k$ as a function of a variation of the electrical power $P_k$ produced,
  for the set of the electrical sources, determining an average coefficient of variation G_moy from the set of the determined coefficients of variation $G_k$,
  for the set of the electrical sources, determining a normalised coefficient of variation G_norm from the set of the determined coefficients of variation $G_k$,
  for each electrical source $S_k$, determining a setpoint of variation of electrical power to be produced $\delta\_P_k$ as a function of the electrical power produced $P_k$, as a function of the determined coefficient of variation $G_k$, as a function of the determined average coefficient of variation G_moy, and as a function of the determined normalised coefficient of variation G_norm,
  for each electrical source $S_k$, determining an electrical power setpoint $C\_P_k$ to be produced as a function of the electrical power produced $P_k$ and of the determined setpoint of variation of electrical power to be produced $\delta\_P_k$,
  controlling each electrical source $S_k$ in such a way that, for each electrical source $S_k$, the electrical power produced $P_k$ is equal to the determined electrical power setpoint $C\_P_k$.

Figure 4:
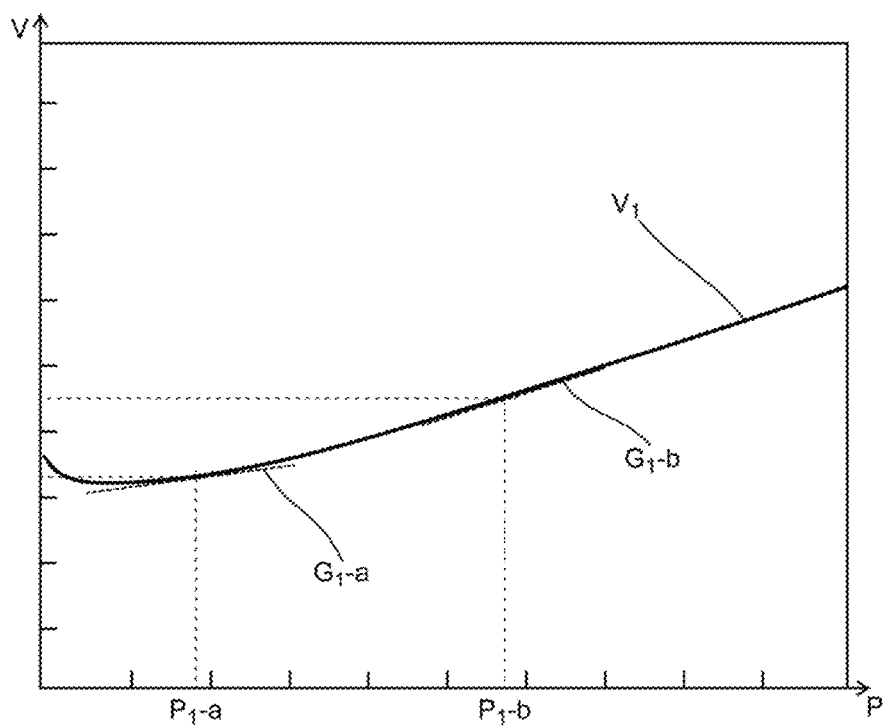
FIG. 4 is a curve schematically representing the evolution of a variable calculated by the proposed method.

FIG. 4 schematically illustrates the coefficient of variation $G_1$ of the value $V_1$ of the physical parameter representative of the operation of the electrical source $S_1$, as a function of the power supplied.

The tangent to the curve $V_1$ at the power point $P_{1-a}$ schematically represents the coefficient of variation $G_{1-a}$ and the tangent to the curve $V_1$ at the power point $P_{1-b}$, schematically represents the coefficient of variation $G_{1-b}$.

According to an exemplary embodiment of the control method, the setpoint of variation of electrical power to be produced $\delta\_P_k$ is determined from a predetermined coefficient c.

The predetermined coefficient c is a multiplying factor applied to the determined setpoint of variation of electrical power to be produced $\delta\_P_k$.

The predetermined coefficient c takes a single value for all of the electrical sources of the electrical network.

The predetermined coefficient c can be a constant value. The predetermined coefficient c is comprised between 0 and 1.

The predetermined coefficient c for example is comprised between 0.25 and 0.40.

A value close to 1 allows for a more rapid convergence, that is to say one requiring fewer iterations to reach an optimised value. A value close to 0 allows for a greater stability of the control, with a higher stabilisation time to obtain a convergence.

The predetermined coefficient c can be a value that changes in real-time. The predetermined coefficient c can vary in real-time as a function of the variations of electrical power setpoint of the electrical network 1.

According to one aspect of the control method, the different steps are iterated so as to converge towards a minimum value $V\_min$ of the physical parameter V representative of the operation of the electrical network 1.

According to one embodiment of the control method, the coefficient of variation $G_k$ of the value $V_k$ of the physical parameter representative of the operation of the electrical source $S_k$ as a function of a variation of the electrical power $P_k$ produced is calculated by the equation:

$$G_k = \frac{d}{dP_k} V_k(P_k) \qquad \text{[Math. 1]}$$

The coefficient of variation $G_k$ is equal to the partial derivative of the value $V_k$ with respect to the electrical power $P_k$ produced, in other words the local slope of the curve of the value $V_k$ as a function of the electrical power $P_k$ produced.

According to one embodiment of the control method, the average coefficient of variation $G\_moy$ is calculated by the equation:

$$G\_moy = \frac{1}{n} \sum_{i=0}^{n-1} \frac{d}{dP_k} V_k(P_k) \qquad \text{[Math. 2]}$$

The average coefficient of variation $G\_moy$ is equal to the arithmetic mean of the coefficients of variation $G_k$ determined for each of the electrical sources $S_k$ of the set E of electrical sources.

According to one embodiment of the control method, the normalised coefficient of variation $G\_norm$ is calculated by the equation:

$$G\_norm = \frac{1}{n} \sqrt{\sum_{i=0}^{n-1} \left( \frac{d}{dP_k} V_k(P_k) \right)^2} \qquad \text{[Math. 3]}$$

The normalised coefficient of variation $G\_norm$ is equal to the root mean square of the coefficients of variation $G_k$ determined for each of the electrical sources $S_k$ of the set E of electrical sources.

According to one embodiment of the control method, the electrical power setpoint $C\_P_k$ to be produced is calculated as a function of the electrical power produced $P_k$ and from the setpoint of variation of electrical power to be produced $\delta\_P_k$ determined by the equation:

$$C\_P_k = P_k + \delta\_P_k = P_k - c \cdot \frac{G_k - G\_moy}{G\_norm} \qquad \text{[Math. 4]}$$

The equation used allows for a rapid convergence towards a minimum value, with a moderate computation complexity.

The calculation of the coefficients of variation makes it possible to determine in which direction and with which amplitude the electrical power setpoint must be modified for each electrical source $S_k$. The calculation is iterated to a convergence to a minimum value.

The setpoint of variation of electrical power to be produced $\delta\_P_k$ is determined by the equation:

$$\delta\_P_k = -c \cdot \left( \frac{d}{dP_k} V_k(P_k) - \frac{1}{n} \sum_{i=0}^{n-1} \frac{d}{dP_k} V_k(P_k) \right) \Big/ \left( \frac{1}{n} \sqrt{\sum_{i=0}^{n-1} \left( \frac{d}{dP_k} V_k(P_k) \right)^2} \right) \qquad \text{[Math. 5]}$$

The disclosure relates also to an electronic control unit 100, configured to implement the control method described previously.

The electronic control unit can drive the different electrical sources from the various information received from the electrical network 1.

The invention claimed is:

1. A method for controlling a set of electrical sources that are interconnected so as to supply an electrical network, each electrical source being configured to produce an electrical power that can be controlled in real-time,
the method comprising the steps of:
(i) determining in real-time a total electrical power requirement to be supplied to the electrical network by the set of electrical sources,
(ii) determining, for each electrical source, a value of a physical parameter representative of the operation of the electrical source as a function of the electrical power supplied by the electrical source,
(iii) determining, for the set of the electrical sources, the sum of the values of the physical parameter representative of the operation of each electrical source, so as to form a total value of the physical parameter representative of the operation of the electrical network,
(iv) controlling the electrical power supplied by each electrical source such that the total electrical power produced by the set of electrical sources is equal to the total electrical power supply requirement to be supplied to the electrical network and so as to minimise the total value of the physical parameter.

2. The method according to claim 1, wherein the physical parameter representative of the operation of the electrical source is a flow rate of a gaseous compound formed in the operation of the electrical source, or a flow rate of fuel consumed in the operation of the electrical source.

3. The method according to claim 2, wherein the electrical power produced by an electrical source differs from the output electrical power of the electrical network divided by the number of electrical sources of the electrical network.

4. The method according to claim 1, wherein the electrical power produced by an electrical source differs from the electrical power produced by the other electrical sources of the set of electrical sources.

5. The method according to claim 1, wherein the value of the physical parameter representative of the operation of an electrical source is a value mapped as a function of an electrical power supplied by the electrical source.

6. The method according to claim 5, further comprising the step of:
updating a table for determining the value of the physical parameter representative of the operation of the electrical source based on a measured value of the physical parameter representative of the operation of the electrical source.

7. The method according to claim 1, wherein the value of the physical parameter representative of the operation of an electrical source is a value calculated from a prediction model and at least one quantity from among the following quantities: electrical power produced, operating temperature, ambient humidity, type of fuel used.

8. The method according to claim 7, further comprising the step of:
updating the model for predicting the value of the physical parameter representative of the operation of an electrical source based on a measured value of the physical parameter representative of the operation of the electrical source.

9. The method according to claim 1, wherein the value of the physical parameter representative of the operation of an electrical source is a value measured by a measurement sensor.

10. The method according to claim 1, wherein step (iii) further comprises the steps of:
(iii-1) for each electrical source, determining a coefficient of variation of the value of the physical parameter representative of the operation of the electrical source as a function of a variation of the electrical power produced,
(iii-2) for the set of the electrical sources, determining an average coefficient of variation based on the set of the determined coefficients of variation,
(iii-3) for the set of the electrical sources, determining a normalised coefficient of variation based on the set of the determined coefficients of variation,
(iii-4) for each electrical source, determining a setpoint of variation of electrical power to be produced as a function of the electrical power produced, as a function of the determined coefficient of variation, as a function of the determined average coefficient of variation, and as a function of the determined normalised coefficient of variation, and
(iii-5) for each electrical source, determining a setpoint of electrical power to be produced as a function of the electrical power produced and of the determined set point of variation of electrical power to be produced, and wherein step (iv) further comprises the step of:
(iv-1) controlling each electrical source such that, for each electrical source, the electrical power produced is equal to the determined setpoint of electrical power.

11. The method according to claim 10, wherein the setpoint of variation of electrical power to be produced is determined from a predetermined coefficient.

12. The method according to claim 10, wherein:
the coefficient of variation ($G_k$) of the value ($V_k$) of the physical parameter representative of the operation of the electrical source ($S_k$) as a function of a variation of the electrical power ($P_k$) produced is calculated by the equation:

$$G_k = \frac{d}{dP_k} V_k(P_k)$$

the average coefficient of variation (G_moy) is calculated by the equation:

$$G\_moy = \frac{1}{n} \sum_{i=0}^{n-1} \frac{d}{dP_k} V_k(P_k)$$

the normalised coefficient of variation (G_norm) is calculated by the equation:

$$G\_norm = \sqrt{\frac{1}{n} \sum_{i=0}^{n-1} \left(\frac{d}{dP_k} V_k(P_k)\right)^2}$$

the setpoint of electrical power ($C\_P_k$) to be produced is calculated as a function of the electrical power produced ($P_k$) and from the setpoint of variation of electrical power to be produced ($\delta\_P_k$) determined by the equation:

$$C\_P_k = P_k + \delta\_P_k = P_k - c \cdot \frac{G_k - G\_moy}{G\_norm}$$

wherein c is a predetermined coefficient.

13. The method according to claim 1, wherein the different steps are iterated so as to converge towards a minimum value of the physical parameter representative of the operation of the electrical network.

14. An electronic control unit, configured to implement the control method according to claim 1.

* * * * *